US007054778B2

(12) United States Patent
Geiger et al.

(10) Patent No.: US 7,054,778 B2
(45) Date of Patent: May 30, 2006

(54) METHOD AND DEVICE FOR PROCESSING ANALOGUE OUTPUT SIGNALS FROM CAPACITIVE SENSORS

(75) Inventors: Wolfram Geiger, Niedereschach (DE); Alexander Gaisser, Aach (DE); Norbert Niklasch, Munich (DE)

(73) Assignee: Hahn-Schickard-Gesellschaft fur Angewandte Forschung e.V., Villingen-Schwenningen (DE)

( * ) Notice: Subject to any disclaimer, the term of this patent is extended or adjusted under 35 U.S.C. 154(b) by 151 days.

(21) Appl. No.: 10/433,177

(22) PCT Filed: Nov. 30, 2001

(86) PCT No.: PCT/EP01/14022

§ 371 (c)(1),
(2), (4) Date: Nov. 10, 2003

(87) PCT Pub. No.: WO02/44741

PCT Pub. Date: Jun. 6, 2002

(65) Prior Publication Data

US 2004/0174832 A1 Sep. 9, 2004

(30) Foreign Application Priority Data

Dec. 1, 2000 (DE) ................................ 100 59 775

(51) Int. Cl.
*G01R 27/28* (2006.01)
(52) U.S. Cl. ........................ 702/117; 702/75; 702/141; 702/145; 370/295; 329/302
(58) Field of Classification Search ................ 702/75, 702/117, 141, 145; 73/1.37; 329/302, 303, 329/304, 323, 325, 341, 345, 347, 358, 360
See application file for complete search history.

(56) References Cited

U.S. PATENT DOCUMENTS

| 4,253,066 | A | * | 2/1981 | Fisher et al. ................. 329/362 |
| 4,509,017 | A | * | 4/1985 | Andren et al. .............. 329/308 |
| 4,547,737 | A | * | 10/1985 | Gibson ........................ 329/343 |
| 4,613,974 | A | * | 9/1986 | Vokac et al. ................. 375/259 |
| 5,142,286 | A | * | 8/1992 | Ribner et al. ................ 341/143 |

(Continued)

FOREIGN PATENT DOCUMENTS

DE 4203819 A1 2/1992

(Continued)

OTHER PUBLICATIONS

Kirsten et al., Undersampling reduces data acquisition costs, Electronics Engineering, Jul. 1991, No. 775, London GB.

*Primary Examiner*—Carol S. W. Tsai
(74) *Attorney, Agent, or Firm*—Michael A. Glenn; Glenn Patent Group

(57) ABSTRACT

An analogue output signal of a sensor which comprises a carrier signal with a carrier frequency $\omega_C$ which is modulated by a measurement size is sampled with a sampling frequency $\omega_A$ to receive a sampled sensor output signal. The frequency $\omega_A$ of the sampling signal is set so that it is an integer divisor n of the carrier frequency $\omega_C$, wherein the phase of the sampling signal is set so that the sampling signal is synchronous to the sensor output signal. The sampled sensor output signal is filtered now to remove periodically repeated signal components from the sampled sensor output signal. Then a filtered useful signal is received, wherein its amplitude is proportional to the measurand detected by the sensor.

21 Claims, 9 Drawing Sheets

BLOCK DIAGRAM OF A DIGITAL EVALUATION ELECTRONIC FOR A CAPACITIVE SENSOR ELEMENT

U.S. PATENT DOCUMENTS

| | | | |
|---|---|---|---|
| 5,162,723 A | | 11/1992 | Marzalek et al. .............. 324/77 |
| 5,258,720 A | * | 11/1993 | Tanis et al. ..................... 327/7 |
| 5,459,432 A | * | 10/1995 | White et al. ................. 329/307 |
| 5,495,204 A | | 2/1996 | Hilby et al. |
| 5,512,843 A | * | 4/1996 | Haynes ....................... 324/772 |
| 5,627,318 A | | 5/1997 | Fujii et al. |
| 5,805,583 A | * | 9/1998 | Rakib ......................... 370/342 |
| 5,889,193 A | | 3/1999 | Pfaff et al. ................... 73/1.37 |
| 6,205,838 B1 | | 3/2001 | Schmid et al. ............... 73/1.37 |
| 6,249,754 B1 | | 6/2001 | Neul et al. .................. 702/145 |
| 6,714,025 B1 | * | 3/2004 | Mohaupt et al. ............ 324/681 |

FOREIGN PATENT DOCUMENTS

| | | |
|---|---|---|
| DE | 19653020 A1 | 12/1996 |
| DE | 19653021 | 12/1996 |
| WO | WO96/21138 | 7/1996 |

* cited by examiner

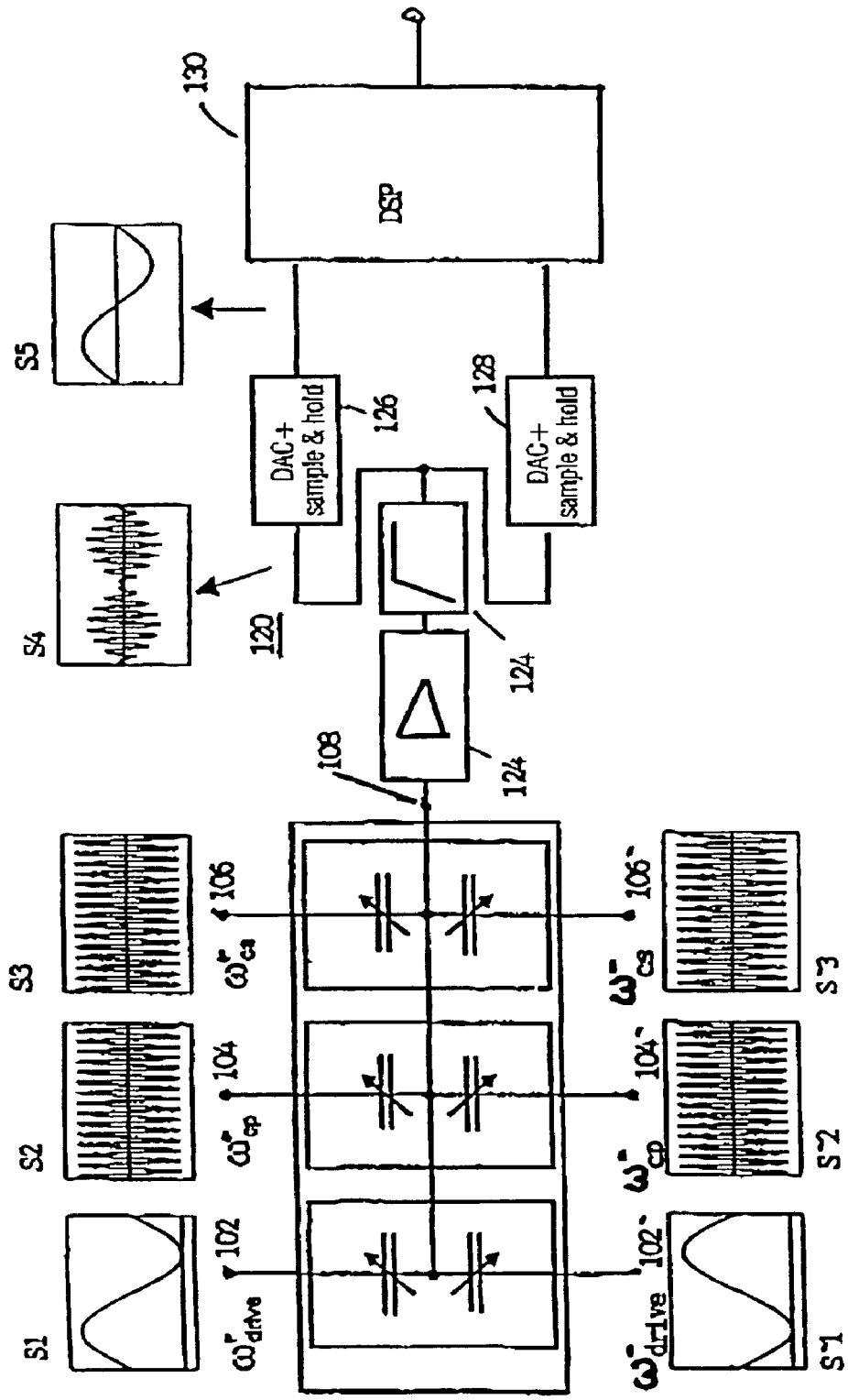
Fig. 1: BLOCK DIAGRAM OF A DIGITAL EVALUATION ELECTRONIC FOR A CAPACITIVE SENSOR ELEMENT

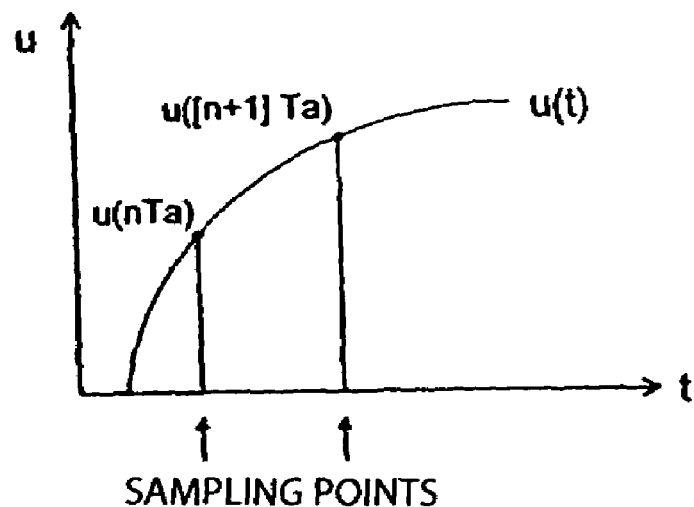
Fig. 2A: SAMPLING PROCESS
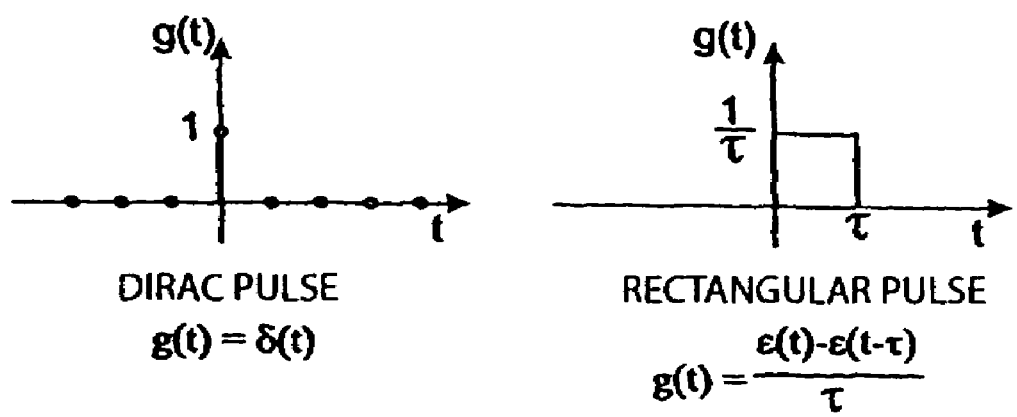
Fig. 2B: DIRAC AND RECTANGULAR PULSES

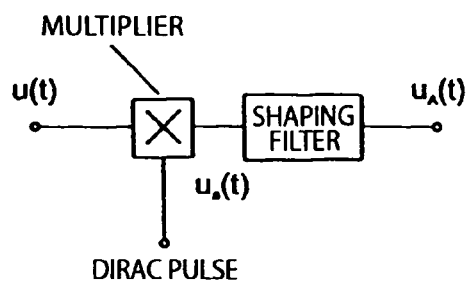
Fig. 2C: MODEL OF A SAMPLER
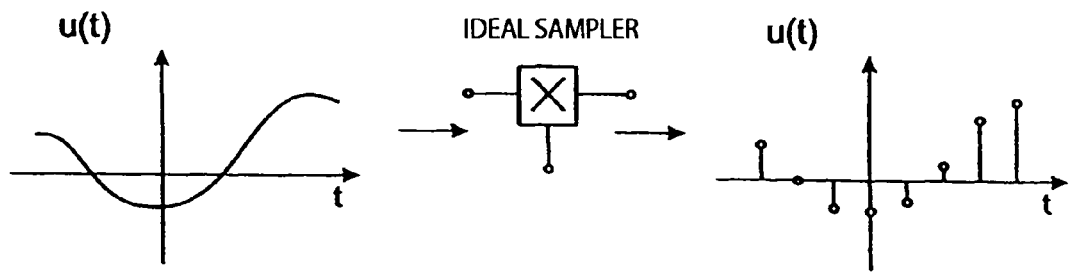
Fig 2D: IDEAL SAMPLER
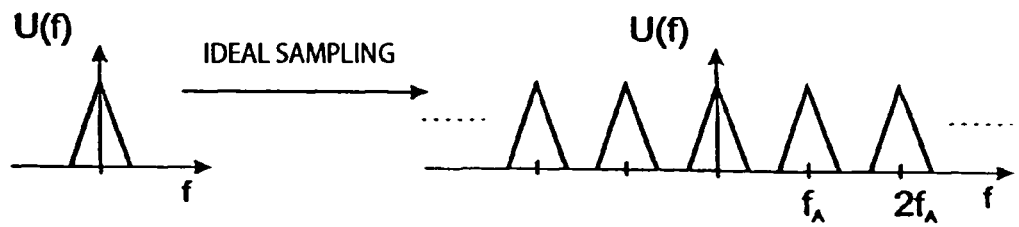
Fig. 2E: IDEAL SAMPLING PROCESS IN A SPECTRAL VIEW
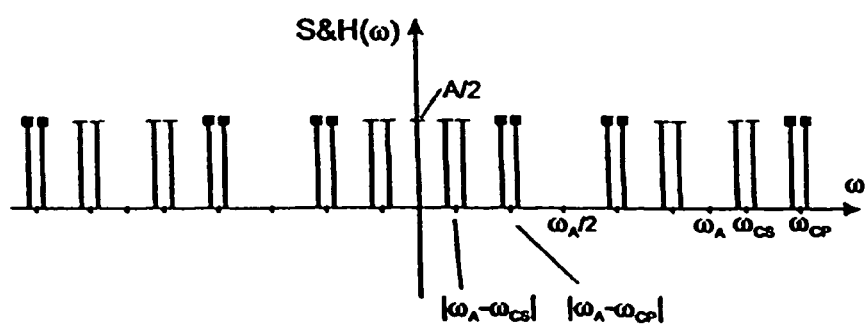
Fig. 2F: INTERMEDIATE MIXING WITH $f_A < f_{CS} + f_{drive}$

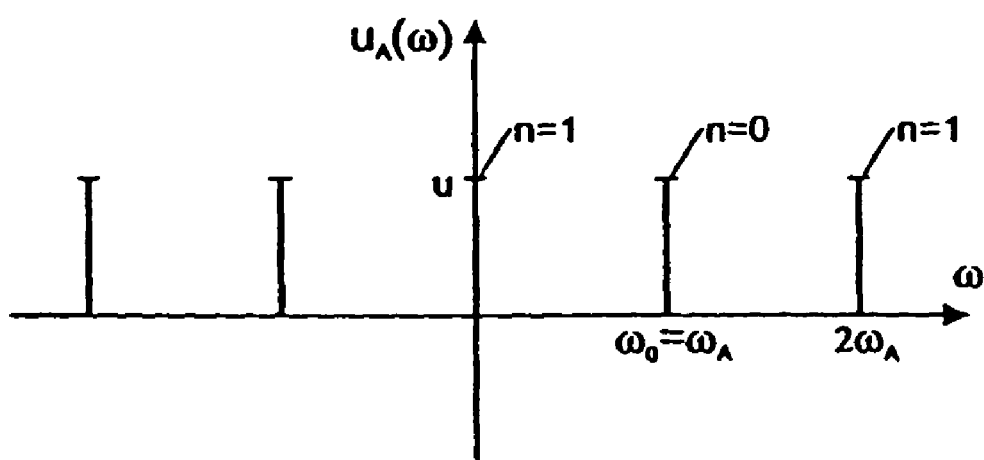
Fig. 2G: SPECTRUM OF A SYNCHRONOUSLY SAMPLED COSINE-WAVE OSCILLATION

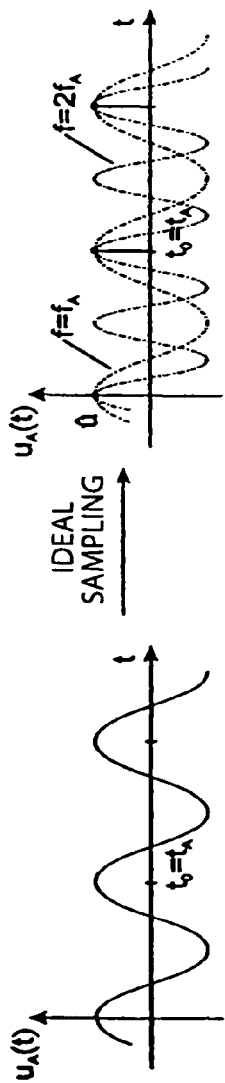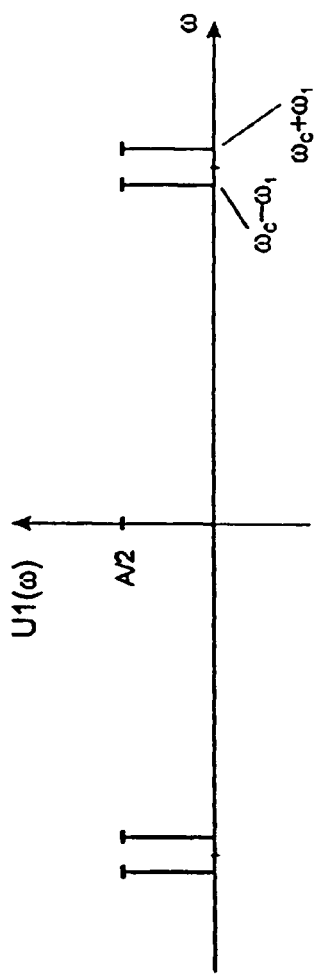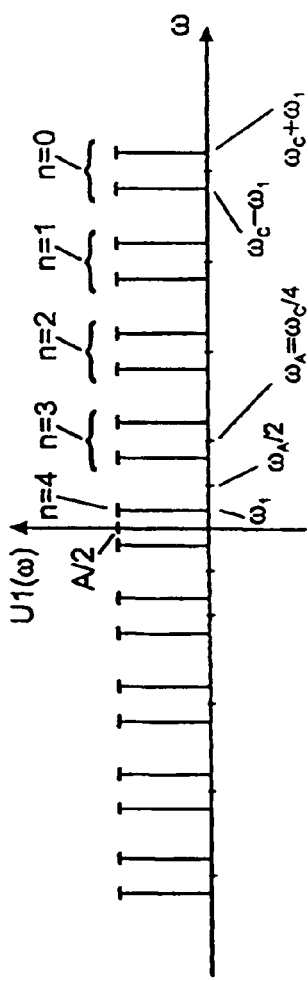
Fig. 2H: TIME COURSE OF A SYNCHRONOUSLY SAMPLED COSINE-WAVE OSCILLATION
Fig. 2I: SPECTRUM OF AN AMPLITUDE MODULATED SIGNAL
Fig. 2J: SPECTRUM OF A SYNCHRONOUSLY UNDERSAMPLED AMPLITUDE-MODULATED SIGNAL

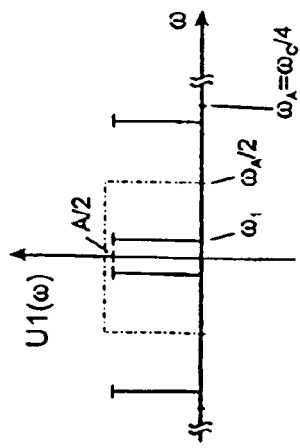
Fig. 2K: SPECTRUM OF A SYNCHRONOUSLY UNDERSAMPLED AMPLITUDE-MODULATED SIGNAL REGARDED FROM 0 TO $\omega_A/2$
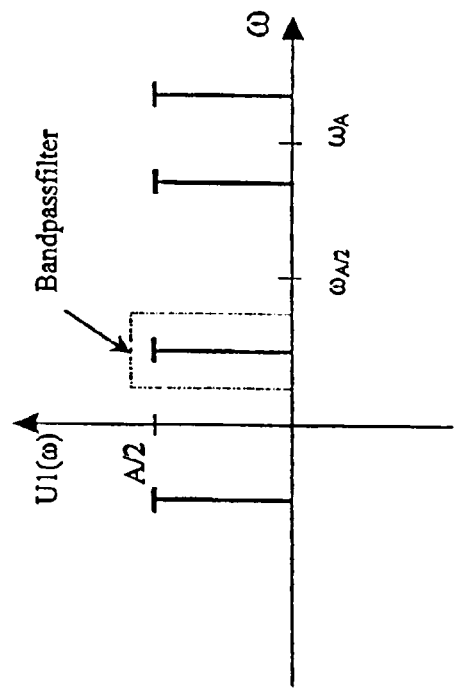
Fig 2L: SPECTRUM OF A SYNCHRONOUSLY UNDERSAMPLED AMPLITUDE-MODULATED SIGNAL WITH BAND-PASS FILTERING

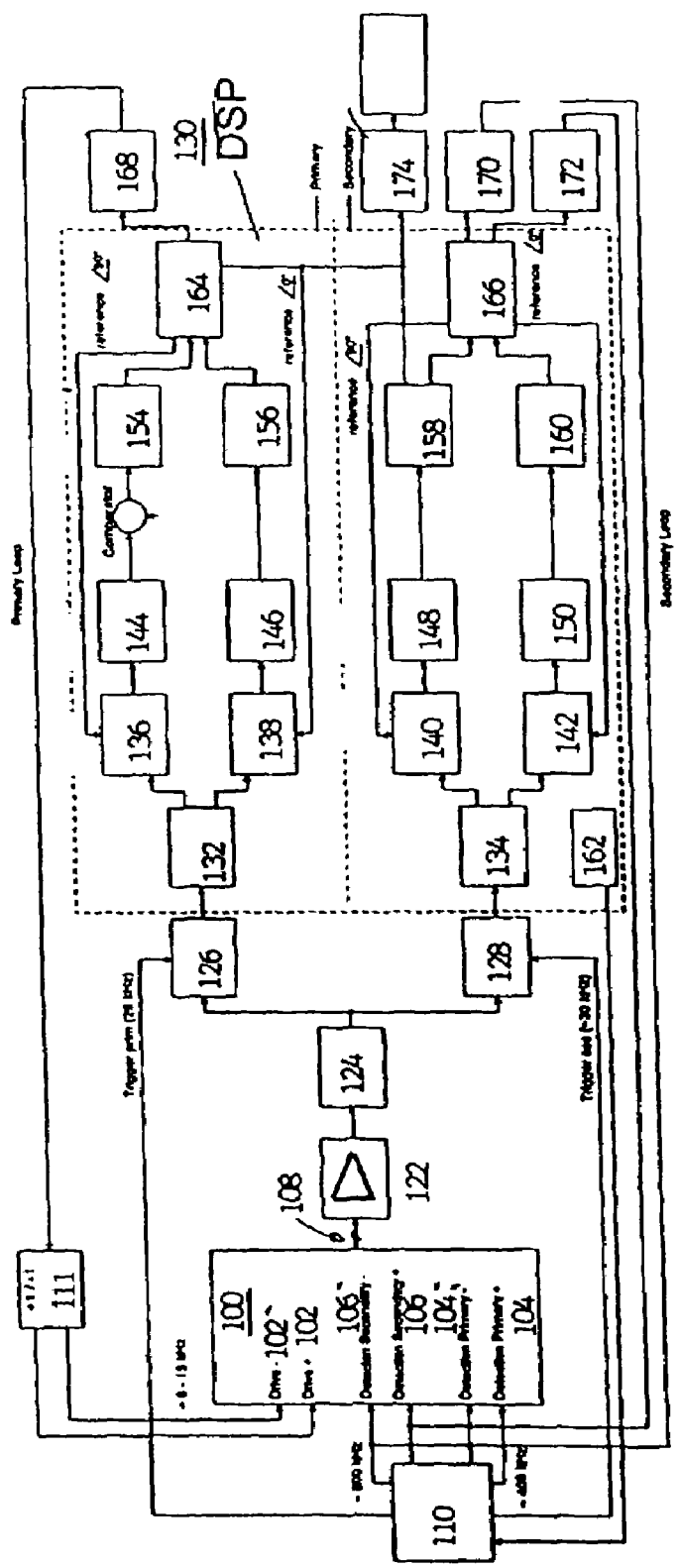
Fig 3: BLOCK DIAGRAM OF A DIGITAL EVALUATION ELECTRONIC FOR A CAPATIVE SENSOR ELEMENT WITH A PRIMARY AND SECONDARY LOOP

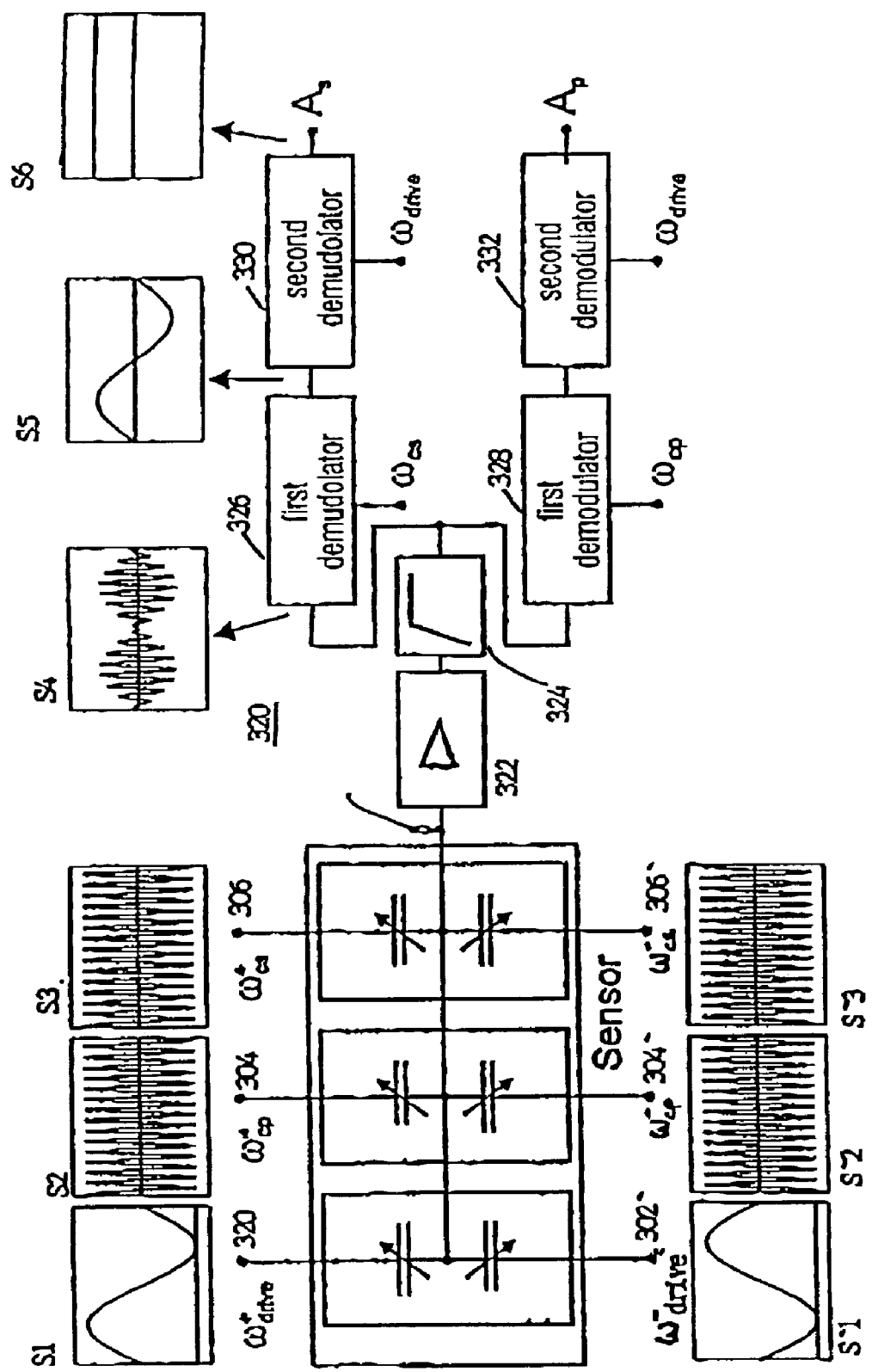
Fig 6: BLOCK DIAGRAM OF A KNOWN ANALOGUE EVALUATION ELECTRONIC FOR A CAPACITIVE SENSOR ELEMENT (PRIOR ART)

METHOD AND DEVICE FOR PROCESSING ANALOGUE OUTPUT SIGNALS FROM CAPACITIVE SENSORS

BACKGROUND OF THE INVENTION

1. Field of the Invention

The present invention relates to the reading out of sensors and in particular to the digital processing of senor output signals comprising a high-frequency carrier signal which is modulated by a measured value. In the following description of the present invention reference is made to capacitive sensors for discussing the inventive concept, like for example to micro-mechanical rotational rate sensors which use the Coriolis power for determining a rotational rate to be detected.

2. Description of the Related Art

Capacitive sensors, like for example micro-mechanical rotational rate sensors, have a variety of application opportunities. Thus, micro-mechanical rotational rate sensors are for example used in robots and mounting systems, in medical technology, in cameras for image stabilizing, in navigation systems, for stabilizing and remote-controlling road and air vehicles and also in airbag and protection systems. In general, such sensors have a movable mechanical structure which is excited to a periodical oscillation. This periodical oscillation generated by excitement is also referred to as primary oscillation. If the sensor is subjected to a rotation around an axis perpendicular to the primary oscillation or the primary movement, then the movement of the primary oscillation leads to a Coriolis force which is proportional to the measurand, i.e. the angular velocity. By the Coriolis force a second oscillation orthogonal to the primary oscillation is excited. This second oscillation which is orthogonal to the primary oscillation is called secondary oscillation. The secondary oscillation, which is also referred to as detection oscillation, may for example be detected by a capacitive measurement method, wherein the capacitively detected measurand serves as a measure for the rotational rate operating on the rotational rate sensor.

In micro-technical sensors, thereby the electronic signal evaluation is of a great importance, as the performance of the overall sensor system is to a large extend determined by the used read out and evaluation electronics. Due to the small dimensions of the micro-mechanical structure of current rotational rate sensors, like for example the rotational rate sensor DAVED®, which was developed by the Institute for Micro and Information Technology of the Hahn-Schickard-Gesellschaft e.V., very small capacities and capacity changes, respectively, down to a range of about $10^{-18}$ F must be detected, so that only very small voltages are received as sensor output signals which may, however, not be evaluated directly.

In micro-mechanical rotational rate sensors this sensor output signal is mainly limited by the noise of the electronic components of the evaluation electronic, as the actual information which is contained within the sensor output signal of the rotational rate sensor may generally not be differentiated from noise below a certain level and may then not be detected anymore.

FIG. 6 shows the block diagram of an exemplary prior capacitive sensor arrangement 300 in the form of a capacitive rotational rate sensor with a connected electronic signal evaluation arrangement 320 to detect and evaluate the capacitively detected measurand, i.e. the rotational rate acting on the sensor arrangement 300.

The capacitive sensor element 300 schematically illustrated in FIG. 6 comprises three input electrode pairs, wherein at the driver input electrode pair 302, 302' driver input signals S1, S'1 with the frequency $\omega^+_{drive}$, $\omega^-_{drive}$ are entered, at the electrode pair 304, 304' primary carrier signals S2, S'2 with the frequency $\omega^+_{CP}$, $\omega^-_{CP}$ are entered, and at the electrode pair 306, 306' secondary carrier signals S3, S'3 with the frequency $\omega^+_{CS}$, $\omega^-_{CS}$ are entered. The indices (+/−) thereby indicate a phase-shifting of the respective signals of 180°, so that the signal S1 is phase-shifted by 180° to S'1, the signal S2 is phase-shifted by 180° to S'2 and the signal S3 by 180° to S'3. Due to internal modulation processes within the sensor element, the actual sensor output signal at the output 308 of the sensor element is an analogue signal, which comprises the information about the detected measurand, e.g. about the present rotational rate, wherein the analogue signal comprises a carrier signal with a carrier frequency $\omega_C$, which is modulated by the measurand.

By the use of high-frequency carrier signals, the signal/noise ratio of the sensor output signal may be improved significantly, wherein in the realization of the signal evaluation electronic with analogue components, the recovery of the useful signal from the amplitude-modulated sensor output signal is performed by a double demodulation in the signal evaluation electronic 320.

The amplitude-modulated sensor output signal is thereby supplied to an (analog) operation amplifier 322 for an amplification. The amplified sensor output signal is then supplied to a high-pass filter 324 to filter out a constant component, like e.g. a DC-offset of the operation amplifier and low-frequency proportions, like e.g. $\omega_{drive}$, $2*\omega_{drive}$, of the analogue sensor output signal. The waveform of the amplified analogue sensor output signal is illustrated as the waveform S4 in FIG. 6. The output signal of the high-pass filter 324 is supplied to a first demodulator (multiplier I) 326, which realizes a first demodulation (multiplication) of the signal S4 using the high-frequency carrier signal S3. This multiplication is realized by a four-quadrant differential amplifier which uses both half-waves of the input signal for multiplication. As a result a sinusoidal alternating signal S5 is obtained wherein its amplitude is directly proportional to the detected measurand, i.e. to the rotational rate.

Subsequently, the signal S5 is supplied to a second demodulator (multiplier II) 330 which converts the sinusoidal signal S5 into a direct current signal or a direct current voltage S6, respectively, which is directly proportional to the amplitude of the alternating current signal and therefore proportional to the measurand. This multiplication is performed with a low-frequency DC-voltage which is phase-shifted to the driver voltage S1.

To explain the above-described known method for reading out and evaluating an analogue sensor output signal in more detail and to be able to compare the same more easily to the inventive read out and evaluation concept later, the principle of the read out and evaluation method according to the prior art is illustrated in a summarized way again in FIG. 5.

The carrier signal $\omega_C$ (e.g. 500 kHz) is fed into the capacitive sensor 300 in the middle by a signal source 310. The signal source 310 is an oscillator with a carrier and reference signal generation. The output signal of the sensor 300 is read out differentially and amplified within the operation amplifier 322. The amplified output signal is then supplied to the multiplier 326 which demodulates the amplified analogue sensor output signal by multiplying the same with the reference signal (500 kHz) from the signal source 310. The waveform S5 (see FIG. 6) is then applied to the output of the multiplier 326.

A major problem referring to this arrangement is, that the first demodulation of the sensor signal has to be performed with the high-frequency carrier signals (e.g. 500 kHz). In an oversampling of the carrier signals, a digital signal processor therefore had to work with a clock frequency which is higher than double the carrier frequency, which may not be realized reasonably with current digital signal processors due to the very extensive calculation operations that would occur.

A further problem regarding the above-described conventional sensor arrangement is, that in addition to the inherent noise of the first (analog) operation amplifier 322 further noise proportions and among others temperature drift is introduced into the useful signal by the electronic evaluation components, whereby the resolution and therefore the sensitivity and measurement accuracy of the sensor arrangement is affected significantly. This therefore leads to an operation performance in processing an output signal of a capacitive sensor arrangement which is not optimum.

SUMMARY OF THE INVENTION

Based on the prior art it is the object of the present invention to provide an improved concept for processing an output signal of a sensor in order to improve the measurement accuracy and sensitivity of a sensor arrangement.

In accordance with a first apect of the invention, this object is achieved by a method for processing an analogue output signal of a sensor, wherein the analogue sensor output signal comprises a carrier signal having a carrier frequency $\omega_C$ and being modulated by a measurand, wherein the method comprises: sampling of the analogue sensor output signal using a sampling frequency $\omega_A$ to obtain a sampled sensor output signal, wherein the sampling frequency $\omega_A$ of the sampling signal is set to be an integer divisor n of the carrier frequency $\omega_C$, and wherein the phase of the sampling signal is set so that the sampling signal is synchronous to the carrier signal $\omega_C$.

In accordance with a second aspect of the invention, this object is achieved by a processing device for providing a sampled sensor output signal, comprising: means for providing a carrier signal having a carrier frequency $\omega_C$; a sensor for detecting a measurand and for outputting an analogue sensor output signal, wherein the carrier signal is supplyable to the sensor, wherein the analogue sensor output signal comprises the carrier signal having the carrier frequency $\omega_C$, which is modulated by the measurand; means for providing a sampling signal having a sampling frequency $\omega_A$, wherein the sampling frequency $\omega_A$ of the sampling signal is set so that the sampling frequency $\omega_A$ is an integer divisor n of the carrier frequency $\omega_C$, and wherein the phase of the sampling signal is set so that the sampling signal is synchronous to the carrier signal; sampling means for sampling the analogue sensor output signal using the sampling signal to obtain the sampled sensor output signal.

The present invention is based on the findings that the processing of a sensor output signal of a sensor element, like e.g. a capacitive rotational rate sensor, may be significantly improved by the use of a digital processing technique.

According to the present invention, the output signal of a sensor element is read into a digital signal processor (DSP) with the use of an analogue to digital converter (A/D converter) using a sample & hold member, in which the useful signal may then be digitally processed and evaluated.

In order to suitably render the amplitude-modulated sensor signal provided with a high-frequency carrier signal for a digital signal processor, so that the digital signal processor may determine and output the measurand to be detected with a relatively low calculation effort, the principle of the so-called undersampling is used in processing the sensor output signal with the present invention.

The above-illustrated principle of undersampling according to the invention may be used for all sensors whose output signal comprises a typical high-frequency carrier signal, which is modulated by a measurand, e.g. amplitude-modulated, i.e. in particular for capacitive sensors. With this principle, first of all high-frequency carrier signals within the sensor arrangement are modulated upon the measurement signal and consequently not demodulated with the high-frequency signal as it is known from the prior art, but the measurement signal is converted into a useful signal which is easy to process for the digital signal processor with the use of an A/D converter with a sample & hold member using a lower sampling frequency. With a "suitable" selection of the sampling frequency for the undersampling process, the sampled sensor output signal whose amplitude is proportional to the measurand may be directly processed digitally by the digital signal processor in order to determine the measurand.

In the case of a capacitive rotational rate sensor this means that the amplitude of the useful signal is proportional to the capacity of the capacitive sensor element and to the capacity change, respectively, when a differential read-out method is present.

As it was discussed above, using the present invention the analogue output signal of a sensor is to be processed advantageously, wherein the analogue sensor output signal comprises a high-frequency carrier signal which is modulated by a measurand (e.g. amplitude-modulated). The above-mentioned "suitable" selection of the sampling frequency of the sampling signal is of a decisive importance in the inventive principle of undersampling used.

In the present invention, the analogue sensor output signal is sampled using an A/D converter comprising a sample & hold member, wherein the sampling frequency is set so that the carrier frequency of the sensor output signal is an integer multiple of the sampling frequency.

As the carrier frequency $\omega_C$ with capacitive sensors is usually higher than the frequency $\omega_{drive}$ of the useful signal by a factor of 30–500, the sensor output signal may also be sampled with a lower frequency than the carrier frequency in order to be able to reconstruct the useful signal completely, i.e. without information loss. At the same time, the phase of the sampling signal must be selected so that it is synchronous to the carrier signal in the sensor output signal. This is for example achieved by a synchronous frequency division of the carrier signal. In order to obtain the useful signal from the sampled sensor output signal, the sampled sensor output signal must be filtered, i.e. band-pass filtered, in order to remove periodically repeated higher-frequency signal proportions of the sampled signal from the same, wherein the amplitude of the band-pass filtered signal, i.e. the useful signal, is proportional to the measurand detected by the sensor. The band-bass filtering and the further processing and rendering of the sampled sensor is thereby performed digitally in a digital signal processor (DSP) downstream to the A/D converter.

From the received useful signal, the measurand to be detected, like e.g. the rotational rate may be determined from the digital signal processor without substantial calculation efforts. As no extensive calculation operations are required due to the undersampling, therefore the overall (digital) signal processing and evaluation, i.e. the sampling and filtering of the sensor output signal and the determination of the measurand may be performed by a digital signal processor.

Due to the possibility to be able to perform the processing of a sensor output signal of a sensor element using a signal processor basically digitally, a plurality of advantages result.

The possibility to start the conversion process at an especially defined point of time is especially important for the evaluation of the sensor signal in order to guarantee the exact maintenance of the undersampling of the sensor output signal. The corresponding bandwidth of this A/D converter comprising the sample & hold member must therefore be selected corresponding to the highest signal frequency. A further advantage of this principle is that the conversion from the analogue to the digital part is performed directly after the first amplification of the sensor signal, wherein in this case the useful signal is only limited by the inherent noise of the first (analog) amplifier.

With a capacitive sensor, like e.g. a capacitive acceleration sensor, the useful signal may be directly evaluated using this undersampling method as the A/D converter maps the spectrum to the overall frequency area.

With a suitable selection of the sampling frequency as a direct divisor of the carrier evaluation frequency, the spectrum may be shifted so that the carriers are shifted into the zero point (f=0 Hz) and the information in the amplitude of this signal, i.e. the acceleration (capacity) is directly proportional to the amplitude of the measurement signal.

In a differential capacitive read-out method, as it is for example used in the rotational rate sensor DAVED®, therefore the first demodulation stage may be omitted, as this is already performed by the special A/D converter. In this case an alternating voltage is obtained wherein its amplitude corresponds to the rotational rate. If this signal is again demodulated (2. demodulation) then this demodulation is calculated directly and the corresponding algorithms are directly performed in a digital signal processor (DSP).

The actual information (bit combination proportional to the rotational rate) is digitally output from the digital signal processor or may be further processed as a PWM signal (PWM=pulse width modulation) so that with a possible D/A conversion of the useful signal no data losses and no additional noise, respectively, must be accepted. With this method the noise of the electronic circuit may be reduced and the actual resolution capability of the sensor may almost be achieved.

For the setup of a complete sensor system with different capacitive sensors (gyroscope, acceleration sensor, inclination sensor etc.) this read-out method is ideal. In the digital signal processor (DSP) the individual sensor signals may be compared to each other or calculated, respectively, wherein with optimized regulation algorithms the capacity of the overall system may be improved.

If for example several rotational rate sensors are used together in different angle positions, the movement and the velocity of an object may be determined. Therefore, low-cost, low-interference (i.e. extremely reliable) and smallest rotational rate sensors may be realized for specific tailor-made industrial applications by micro-mechanical manufacturing processes. With the inventive digital read out and evaluation method, for example rotation movements up to a range of about 0.01° per second may be detected for capacitive rotational rate sensors.

Due to the reduced signal processing requirements to the digital signal processors which are used in the present invention for sensor signal evaluation, it is possible, that the same take over additional tasks and functions for each individual sensor or for the overall system, like for example an active temperature compensation with the help of PI regulators, a self-calibration and a self-diagnosis function.

BRIEF DESCRIPTION OF THE DRAWINGS

In the following, preferred embodiments of the present invention are explained in more detail with reference to the accompanying drawings, in which:

FIG. 1 shows a block diagram of digital signal evaluation electronics for a sensor element according to the present invention;

FIGS. 2A–L show illustrations for explaining the process of undersampling with the digital evaluation of an output signal of the capacitive sensor;

FIG. 3 shows a block diagram of digital signal evaluation electronics for a capacitive sensor element comprising a primary and a secondary control circuit;

FIG. 6 shows a block diagram of conventional analogue signal evaluation electronics for a sensor arrangement.

DETAILED DESCRIPTION OF PREFERRED EMODIMENTS

Figure 5:
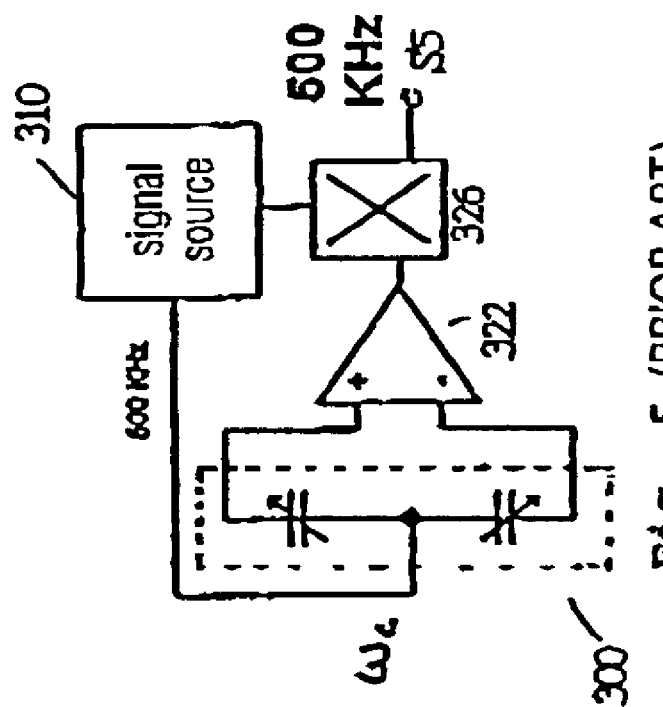
FIG. 5 shows a principal illustration of a conventional analogue signal evaluation arrangement.

FIG. 1 shows the block diagram of digital read out and evaluation electronics 120 for a sensor arrangement 100 according to the present invention. The capacitive sensor element 100 corresponds to the sensor element 300 of FIG. 3 which was already discussed in the description introduction. In the following description of the present invention, for explaining the inventive concept reference is made to capacitive sensor elements, like e.g. to micro-mechanical rotational rate sensors, which use the Coriolis force for determining a rotational rate to be detected.

The capacitive sensor element 100 schematically illustrated in FIG. 1 comprises three input electrode pairs, wherein at the driver input electrode pair 102, 102' driver input signals S1, S'1 with the frequency $\omega^+_{drive}$, $\omega^-_{drive}$ are applied, at the electrode pair 104, 104' primary carrier signals S2, S'2 with the frequency $\omega^+_{cp}$, $\omega^-_{cp}$ are arranged, and at the electrode pair 106, 106' secondary carrier signals S3, S'2 with the frequency $\omega^+_{cs}$, $\omega^-_{cs}$ are applied. The indices (+/−) thereby indicate a phase-shift of the respective signals by 180°, so that the signal S1 is phase-shifted by 180° to S'1, the signal S2 by 180° to S'2 and the signal S3 by 180° to S'3. Due to internal modulation processes within the sensor element the actual sensor output signal at the output 108 of the sensor element is an analogue signal which comprises a high-frequency carrier signal which is modulated by a measurand. The sensor output signal therefore includes the information about the detected measurand, e.g. about the present rotational rate.

As with capacitive rotational rate sensors very small capacities or capacity changes, respectively, down to a range of about $10^{-18}$ F must be detected, only small voltages are received as sensor output signals which may not be evaluated directly. By the use of high-frequency carrier signals which are modulated with the detected measurand, the signal/noise ratio of the sensor output signal may be improved significantly.

As with the sensor arrangement described for the prior art, the amplitude-modulated output signal of the sensor provided with a high-frequency carrier signal is first supplied to an (analog) operation amplifier and amplified there.

The output 108 of the sensor element 100 is interconnected with the input of digital read out and evaluation electronics 120. At the input of digital evaluation electronics 120 an operation amplifier 122 is arranged, wherein at its input the output signal of the capacitive sensor element 100 is applied. The output of the operation amplifier 102 is connected to an analogue high-pass filter 124. The output of the high-pass filter 124 is connected to two analog/digital converters 126, 128, comprising a sample & hold member. The outputs of the analog/digital converter 126, 128 are connected to a digital signal processor 130.

The amplified sensor output signal is supplied to the high-pass filter 124, to filter out DC components, like for example a DC offset of the operation amplifier and low-frequency proportions of the sensor output signal. The waveform of the amplified band-pass filtered sensor output signal is illustrated as course S4 in FIG. 1. It may be seen that the amplified sensor signal S4 is an amplitude-modulated signal provided with a high-frequency carrier.

The digital signal processor 130 provides an output signal at its output which reproduces the measurand detected by the capacitive sensor element.

In the following, the functioning of the device and the method for processing an analogue output signal (S4) of a sensor (100) according to the present invention is explained.

In the inventive sensor evaluation arrangement the analogue sensor output signal comprising a carrier signal with a carrier frequency $\omega_C$ which is modulated by a measurand is sampled using an A/D converter 126, 128 with a sample & hold member with a sampling frequency of $\omega_A$ in order to receive a sampled sensor output signal which is present in digital form. The frequency $\omega_A$ of the sampling signal is thereby set so that it is an integer divisor n of the carrier frequency $\omega_C$, whereby: $\omega_C = n\omega_A$.

As it was explained above, by the use of high-frequency carrier signals the signal/noise ratio of the sensor output signal may be improved significantly, wherein in capacitive sensors the carrier frequency $\omega_C$ of the carrier signal is usually set to a frequency higher than 250 kHz and which preferably is about 500–750 kHz.

As the carrier frequency $\omega_C$ with capacitive sensors is usually higher than the frequency $\omega_{drive}$ of the useful signal by a factor of 30–500, the sensor output signal may also be sampled with a lower frequency than the carrier frequency in order to be able to reconstruct the useful signal completely, i.e. without information loss. At that time, the phase of the sampling signal must, however, be set so that the sampling signal is synchronous to the carrier signal. This is generally achieved by a synchronous frequency division of the carrier signal, wherein the carrier frequency $\omega_C$ of the carrier signal is an integer multiple of the sampling frequency $\omega_A$, i.e. $\omega_C = n\omega_A$. The sensor output signal is therefore present in digital form as a sequence of discretely sampled values after the sampling by the A/D converter using the sample & hold member.

This sampled sensor output signal which is present in digital form is further processed digitally in the digital signal processor 130, i.e. among other things it is digitally band-pass filtered, wherein the periodically repeated higher-frequency signal proportions whose frequency is higher than $\omega_A/2$ are to be removed. Hereby, the cut-off frequency of the band-pass filter is preferably set to half the sampling frequency $\omega_A/2$ in order to receive the searched useful signal.

In this connection, reference is made to FIG. 2L for a better understanding, which shows the spectrum of a synchronously undersampled amplitude-modulated signal using band-pass filtering.

As the amplitude of the currently present useful signal is proportional to the measurand detected by the sensor (100), e.g. the rotational rate, the useful signal may be digitally evaluated by a signal processor (130) in order to determine the measurand. The digital signal processor (130) will finally output an analogue or a digital signal which represents the measurand.

In summary, it may be seen that the sensor output signal is converted into a useful signal with the use of the A/D converters 126, 128 comprising the sample & hold member using the so-called undersampling. As a result a sinusoidal signal S5 is present whose amplitude is directly proportional to the measurand to be measured, i.e. to the rotational rate. This useful signal is read into a digital signal processor (DSP) 130 which may further process the useful signal S5 without excessive calculation effort in order to determine the measurand and for example output the same as an analogue or a digital signal.

It is to be noted, that the inventive concept for processing an analogue output signal of the sensor may be used for all analogue sensor output signals, in particular of capacitive sensors, which comprise a carrier signal which is modulated by a measurand.

In the following, the system-theoretical aspects of the present invention on which a realization of the undersampling is based are explained in more detail.

Ideal sampling is to represent a continuous signal u(t) by a sequence of equidistant impulses at the times $t = nT_A$ wherein $n = \ldots -1, 0, 1, \ldots$. Thereby, the impulse areas of the respective values must be proportional at the time $(nT_A)$ (see FIG. 2A: sample process).

The sample period $T_A = 1/f_A$ is the distance between the sampling times. For illustrating the sampled functional values pulses g(t) normalized to 1 are used, as it is illustrated in FIG. 2B (see FIG. 2B: dirac and rectangular pulses).

The description of the sampler is made using a theoretical model. The pulse form of the sampler describes a dirac pulse, the function $\epsilon(t)$ describes a jump function. The sampler may therefore also be described as a simple model of a multiplier with the input values $u_{e1}$ and $u_{e2}$. The result, the output value $u_a$, is again combined with the multiplier constant $U_M$:

$$u_a = \frac{u_{e1} \cdot u_{e2}}{U_M} \qquad (1)$$

With $u_{e1} = u(t)$ and the periodical sequence of dirac pulses $$u_{e2} = u_\delta \cdot T_\delta \cdot \sum_{n=-\infty}^{+\infty} \delta(t - n \cdot T_A) \qquad (2)$$

with the voltage-time-area $u_\delta T_\delta$ after the insertion, the conversion and the consideration of the relation, it is obtained that $\delta(t - nT_A)$ is zero for $t \neq nT_A$:

$$u_a = \frac{u_\delta \cdot T_\delta}{U_M} \cdot \sum_{n=-\infty}^{+\infty} u(nT_A) \cdot \delta(t - n \cdot T_A) \quad (3)$$

Dirac pulses may not be generated in reality, therefore a shaping filter follows the multiplier in the theoretical model of the sampler, which for example converts the dirac pulse into a rectangular pulse.

Thus, the model of a sampler illustrated in FIG. 2C is obtained.

The principal idea of the present invention now is to use this multiplier as a mixer and as the first demodulation stage.

In order to be able to explain the principle in more detail, further considerations are, however, required especially in the spectral area.

The shaping filter replaces the term $\delta(t-n?T_A)$. As a formula for the real sampler the following is obtained:

$$u_a = \frac{u_\delta \cdot T_\delta}{U_M} \cdot \sum_{n=-\infty}^{+\infty} u(nT_A) \cdot \frac{\varepsilon(t - n \cdot T_A) - \varepsilon(t - \tau - n \cdot T_A)}{\tau} \quad (4)$$

The height $u_A(nT_A)$ of a pulse at a location $t=nT_A$ is therefore:

$$u_a(nT_A) = \frac{u_\delta \cdot T_\delta}{U_M \cdot \tau} \cdot u(nT_A) = K_A \cdot u(nT_A) \quad (5)$$

By way of illustration, the function f(t) is converted to a series of weighted dirac pulses by an ideal sampler (see FIG. 2D: ideal sampler).

For a calculation in the frequency domain the spectrum of the sampling signal must be calculated. This is done by way of multiplication of the spectrum of the ideal sampler with the frequency response of the shaping filter. The frequency response is the Fourier transform of the pulse response function g(t). By the Fourier transformation of the function $$g(t) = \frac{\varepsilon(t) - \varepsilon(t - \tau \cdot)}{\tau} \quad (6)$$

a complex frequency response $$F_F(f) = \frac{\sin(\pi \cdot f \cdot \tau)}{\pi \cdot f \cdot \tau} \cdot e^{-j\pi \cdot f \cdot \tau} \quad (7)$$

of the shaping filter is obtained.

The spectrum of the ideal sampler is obtained by developing the dirac pulse sequence $\delta_{per}(t)$ in a Fourier sequence $$\delta_{per}(t) = \sum_{n=-\infty}^{+\infty} \delta(t - n \cdot T_A) = \frac{1}{T_A} \cdot \sum_{n=-\infty}^{+\infty} e^{-j2\cdot\pi\cdot n\cdot f_A \cdot t} \quad (8)$$

and inserting the same into the equation (5) for $u_a(t)$. Then the following relation is obtained:

$$u_a = \frac{u_\delta \cdot T_\delta}{U_M T_A} \cdot \sum_{n=-\infty}^{+\infty} u(t) \cdot e^{j2\cdot\pi\cdot n\cdot f_A \cdot t} \quad (9)$$

With the use of the Fourier transformation $$U(f) = \int_{-\infty}^{\infty} u(t) \cdot e^{-j2\cdot\pi\cdot n\cdot f_A \cdot t} dt \quad (10)$$

differential equations are converted into algebraic equations.

After further transformations and simplifications the following results:

$$u_a(f) = \frac{u_\delta \cdot T_\delta}{U_M T_A} \cdot \sum_{n=-\infty}^{+\infty} U(f - nf_A) \quad (11)$$

This result will be illustrated graphically. The sampling using an ideal sample & hold member causes a periodical repetition of the spectrum of the signal to be sampled with the multiple of the sampling frequency $f_A$. FIG. 2E shows the spectrum of a signal before and after the transformation using an ideal sampler (FIG. 2E: ideal sampling process in spectral view).

The use of the sampler as a demodulation stage is explained in more detail in the time domain using this knowledge in the frequency area and using a graphical illustration of the signals.

To be able to digitize and afterwards reproduce signals perfectly, further conditions must be fulfilled. In this connection this is referred to as sampling theorem. It indicates that the analogue signal must be band-limited, i.e., above the signal cut-off frequency $f_{gs}$ no spectral components must be located so that the original signal may be reconstructed again completely without information loss. For the spectrum U(f) of a signal therefore the condition U(f)=0 for |f|? $f_{gs}$ must be accepted.

The sampling frequency $f_A$ must therefore be double as high as the signal cut-off frequency:

$$f_A ? 2 ? f_{gs} \quad (12)$$

Both conditions must be fulfilled to prevent a so-called aliasing, i.e. an overlapping with the periodic repetition of the spectrum of u(t), as this aliasing effect would otherwise prevent a perfect reproduction of the signal.

In order to correspond to the sampling theorem, the frequency for digitizing must therefore be at least double as high as the highest frequency present in the signal.

If this condition, i.e. the sampling theorem, is applied to inventive evaluation electronics of a sensor, like e.g. of a capacitive rotational rate sensor, this frequency would have to be $F_A ? 2 ?(f_{CS}+f_{drive})$ or $F_A ? 2 ?(f_{CP}+f_{drive})$, respectively. As the signal/noise ratio, i.e. the quotient from the amplitude of the transmitted signal to the noise amplitude, should be as high as possible, the carrier frequency should be as high as possible, e.g. several hundred kHz. If the carrier frequency is therefore 500 kHz or higher, the sampling rate should consequently be higher than 1 MHz.

The processing in this clock cycle results in large amounts of data. I.e., with a cut-off frequency of 100 Hz of the sensor rotational rate changes are detected at maximum up to a period time of 10 msec. The information to perfectly map the drive frequency (1–10 kHz) is at 10000 oscillations per second. With a carrier frequency of for example 500 kHz the sampling process must be performed according to the sampling theorem with a frequency of 1 MHz. This represents a factor of 10000 in relation to the bandwidth of 100 Hz. The sampling must therefore be performed with the factor 100*10000 (=1*10$^6$) due to the high carrier frequency compared to the necessary information.

As it is shown in FIG. 2C (model of a sampler), the sampler consists of a multiplier and a shaping filter. It is therefore obvious to use this characteristic to aim at a so-called intermediate mixing or a synchronous sampling or undersampling, respectively, with certain characteristics and limiting values.

With an intermediate mixing the characteristic is used, that the signal is identical in the ranges 0 to $f_A$ and n?$f_A$ to (n+1)?$f_A$, respectively, with an ideal sampler, and that no band-limited signal with a DC proportion should be evaluated. It is therefore possible to "shift" the signal band with the necessary information into a range in which the amounts of data may be processed again. In FIG. 2F a so-called intermediate mixing is illustrated by $f_A < f_{CS} + f_{drive}$.

With a suitable selection of the sampling frequency it is possible to shift the useful frequency directly into the zero point and therefore to realize the first demodulation with the sampling member or with the integrated analog/digital converter, respectively.

At that time, an oscillation with the frequency $\omega_0$ with the same period length $T_A = 1/\omega_0$ is sampled. At a starting point here the ideal sampler is used, wherein the integration of the real sampler with the characteristic additional frequency response sin(x)/x has no influence on this consideration.

The formula for the sampled oscillation with the equation (11) and considering $$k_\delta = \frac{u_\delta \cdot T_\delta}{U_M T_A} = 1 \tag{13}$$

and $$e^{jx} = \cos(x) + j\sin(x) \tag{14}$$

and after a simplification is:

$$u_a(t) = \hat{u} \cdot \sum_{n=-\infty}^{+\infty} \cos(\omega_0 t) \cdot \cos(n\omega_0 t). \tag{15}$$

Equidistant sampling values with frequency proportions visible in the spectrum are obtained, which are designated with the index variable n. FIG. 2G shows a spectrum of a synchronously sampled cosine oscillation. The synchronous sampling may be illustrated graphically in the time domain with the following signal images, wherein FIG. 2H shows the time course of a synchronously sampled cosine oscillation.

By this process, the sum of "possible signals" seams endless, i.e. the sampling values are fulfilled by any multiples, starting with "zero" of the sampling frequency. If the signal in digital signal processing is regarded from the direct voltage proportion to half of the sampling frequency, this corresponds to a frequency shift into the zero point of the frequency axis and therefore to a demodulation. The separation of the higher-frequency proportions is done theoretically with an ideal low-pass whose cut-off frequency corresponds to half of the sampling frequency.

$$u_a(t) = \begin{Bmatrix} \hat{u} & \text{for} & \omega \leq \frac{\omega_A}{2} \\ 0 & \text{otherwise} \end{Bmatrix} \tag{16}$$

In a circuit construction this is realized by a low-pass which is as steep as possible, e.g. using software, which attenuates undesired harmonics as strong as possible.

As it was illustrated in the previous section, the sampler may be used for a determination of the amplitude and the phase of an oscillation, i.e. as a first demodulation stage, when the sampling process is synchronous to the carrier.

As the factor for the frequency distance from the wave to be detected to the information-loaded oscillation in the range from 30 to 500 (i.e. the ratio of the frequency of the carrier signal to the frequency of the useful signal), not every synchronous value needs to be used, so that a further undersampling of the signal is possible.

The undersampling factor $v_{uds}$ describes the ratios of the oscillation frequency $\omega_{CS}$ to the sampling frequency $\omega_A$.

$$v_{uds} = \frac{\omega_{CS}}{\omega_A} \tag{17}$$

At the following example this process is to be described in more detail, wherein the factor $v_{uds}$ is here for example selected to be four. An amplitude-modulated signal $$U1(t) = [A? \cos(\omega_1 t)]? \cos(\omega_C t) \tag{18}$$

serves as an input, which is illustrated spectrally, as it is shown in FIG. 2I. FIG. 2I further shows a spectrum of an amplitude-modulated signal.

The spectrum consists of two superimposed oscillations with the frequencies $\omega_C \pm \omega_1$. This is transformed using an ideal sampler and illustrated both mathematically and as a spectrum (see FIG. 2J).

At that time, the sampling frequency $\omega_A$ is a quarter of a carrier frequency $\omega_C$, wherein the frequency $v_{uds}$ is four. With the same preconditions as in the synchronous sampling using equation (15), and in addition using the equations (17) and (18), the output signal U1(t) of the converter is obtained:

$$U1(t) = A \cdot \sum_{n=-\infty}^{+\infty} \left[ (\cos(\omega_C t + \omega_1 t) + \cos(\omega_C t - \omega_1 t)) \cdot \cos\left(\frac{n}{v_{uds}} \omega_C t\right) \right] \tag{19}$$

FIG. 2J shows a spectrum of a synchronously undersampled amplitude-modulated signal.

When regarding the relevant signals in FIG. 2K, i.e. of the designated area between 0 and half the sampling frequency $\pm \omega_A/2$, using the condition $$\frac{n}{v_{uds}} = 1 \tag{20}$$

the output signal U1 results:

$$U1(t) = A? \cos(\omega_1 t). \tag{21}$$

FIG. 2K shows a spectrum of a synchronously undersampled amplitude-modulated signal from 0 to $\pm\omega_A/2$.

The spectrum of this range from $-\omega_A/2$ to $\omega_A/2$ is repeated periodically after $n\omega_A/2$ to $\pm\omega_A/2$ using $n=[-x \ldots -1, 0, 1 \ldots +x]$.

The further calculation area is limited by an ideal low-pass to $\omega_A/2$, or the occurring harmonics of the sampled sensor output signal are attenuated as good as possible using a real low-pass, respectively.

If the signal should be output directly after sampling and if $\omega_A/2$ and $\omega_1$ are close to each other, then the following low-pass must be of a high order, i.e. very steep-sloped, in order to make the occurring harmonic disappear as far as possible.

As it may be noted from the considerations and calculations, the A/D converter may basically be used as the first demodulation stage. The A/D converter or the sample & hold member, respectively, must fulfill special frame conditions which are explained in more detail in the following.

The most important link between sensor and electronics is the A/D converter with its special characteristics. The digital processing of the sensor signal requires the direct transfer into a sequence of numbers by sampling without information loss. The so-called sample & hold member is to work almost as an ideal sampling member in this application, i.e. this member may only withdraw very short "samples" of the sensor signal. In this case, so to speak pinprick-like taps of the signal must be performed and therefore the acquisition time, i.e. the time in which the samples are taken, is of a major importance.

With the inventive electronic evaluation arrangement for a digital evaluation of the output signals of capacitive sensor elements many advantages over conventional analogue evaluation electronics are achieved.

Figure 4:
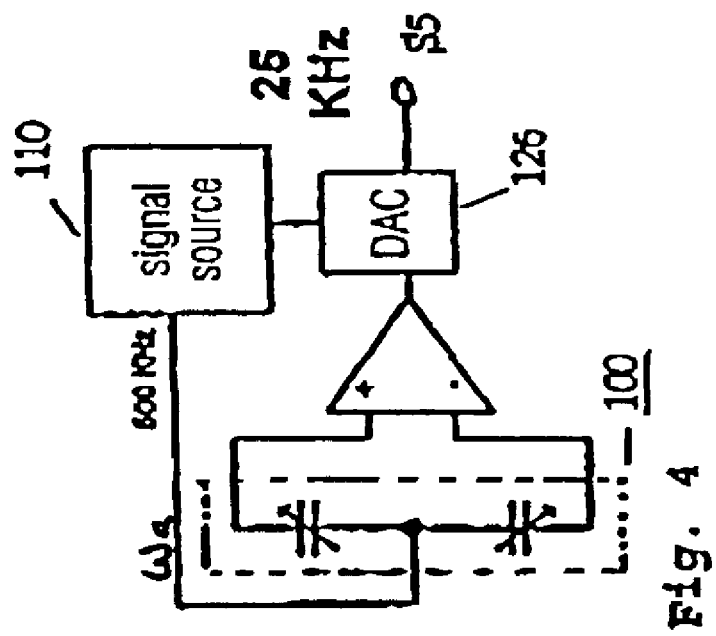
FIG. 4 shows a principal illustration of the inventive digital signal evaluation arrangement.

For a better understanding and for clarifying the advantageous technical concept of the present invention now the principles of the inventive read-out method are directly compared to the known read-out method illustrated in FIG. 5 using FIG. 4.

As it was already performed with regard to FIG. 5, the amplified analogue sensor output signal is demodulated in the readout method according to the prior art, by multiplying the signal with the carrier frequency (e.g. 500 kHz) (see FIG. 5).

In the inventive concept for digitally reading out a capacitive sensor, as it is basically illustrated in FIG. 4, the carrier frequencies in the middle of the sensor 100 are fed in from a signal source 110, i.e. the carrier and driver signals are internally fed in at a common center electrode of the capacitive sensor 100, wherein the sensor output signal is tapped on the exterior at the exterior electrodes of the capacitive sensor 100. The sensor signal is differentially read out and amplified using the operation amplifier 122. The amplified analogue sensor output signal is now demodulated using an analog/digital converter having a sample & hold member, wherein the sampling signal provided by the signal source 110 is an integer divisor of the carrier frequency. This is usually achieved by a synchronous frequency division of the carrier signal in the signal generator, so that the sampling signal is synchronous to the carrier signal. At the output of the analog/digital converter 126 now the signal course S5 (see FIG. 1) is present in digital form as the sequence of discretely sampled values. This digital signal may now be processed further with a relatively low calculation effort by the digital signal processor 130.

It is, however, equally possible using the inventive evaluation arrangement that the carrier and driver signal are fed in at the exterior of the exterior electrodes 102–106, 102'–106' of the capacitive sensor, wherein the sensor output signal may then be tapped at the common center electrode 108 of the sensor 100, as it is for example shown in FIG. 1.

By the comparison of the inventive read-out method illustrated in FIG. 1 and the read-out method according to the prior art illustrated in FIG. 5 it is made clear that with the so-called undersampling technique, due to the basically complete digital processing of the sensor output signal, which is further possible with a relatively low calculation effort for the digital signal processor, a plurality of advantages may be achieved.

The possibility to start the conversion process at an especially defined point of time is especially important for the evaluation of the sensor signal in order to guarantee the exact maintenance of the undersampling of the sensor output signal. The corresponding bandwidth of this A/D converter comprising the sample & hold member must therefore be selected corresponding to the highest signal frequency. A further advantage of the principle is, that the conversion from the analogue to the digital part is performed directly after the first amplification of the sensor signal, wherein in this case the useful signal is only limited by the inherent noise of the first (analog) amplifier. At that time it is to be noted that the quantizing noise of the A/D converter is drowned out by the noise of the sensor.

In a capacitive acceleration sensor the useful signal may therefore be directly evaluated with the use of this undersampling method, as the A/D converter maps the spectrum to the overall frequency area. With a suitable selection of the sampling frequency as a direct divisor of the carrier evaluation frequency, the spectrum may be shifted so that the carriers appear as a DC voltage and the information in the amplitude of this signal, i.e. the acceleration (capacity), is directly proportional to the amplitude of the measurement signal.

With a capacitive read-out method, at it is for example used with the rotational rate sensor DAVED®, the first demodulation stage may be omitted, as this is already performed by the special A/D converter. In this case an alternating signal is received whose amplitude corresponds to the measured rotational rate. If this signal is demodulated again (second demodulation) then this demodulation is digitally calculated and the corresponding algorithms are directly performed in a digital signal processor (DSP).

The actual information (bit combination proportional to the rotational rate) is digitally output from the digital signal processor or may be further processed as the PWM signal (PWM=pulse width modulation), in order to not to have to accept data losses or an additional noise, respectively, in a possible D/A conversion of the useful signal. With this method the noise of the electronic circuit may be reduced and the actual resolution capability of the sensor may almost be achieved.

For the construction of a complete sensor system with different capacitive sensors (gyroscope, acceleration sensor, inclination sensor, etc.) this read-out method is ideal. In the digital signal processor (DSP) the individual sensor signals may be compared to each other and calculated, respectively, wherein with optimized regulation algorithms the performance capacity of the overall system may be improved.

If, for example, several rotational rate sensors in different angle positions are used together, the movement and the velocity of an object may be determined. By micro-mechanical manufacturing methods therefore low-cost, low-interference (i.e. extremely reliable) and smallest rotational rate sensors for specific tailor-made industrial applications may be realized. With the inventive digital read-out and evaluation method rotary movements down to a range of about 0.01° per second may be detected for capacitive rotational rate sensors.

Due to the decreased requirements and capacity utilization of the digital signal processors which are used for the sensor signal evaluation in the present invention, it is possible, that these make take over additional tasks and functions for each individual sensor or for the overall system due to the velocity and flexibility, like for example an active temperature compensation using PI regulators, a self-calibration and a self-diagnosis function.

Referring to FIG. 3 now the practical construction of an inventive digital sensor signal read-out arrangement in the form of a block diagram of digital evaluation electronics for a capacitive sensor element comprising primary and secondary control circuits is discussed. It is to be noted that the elements in FIG. 3 which correspond to the corresponding elements of FIG. 1 are provided with the same reference numerals.

The sensor used herein corresponds to the capacitive sensor 100 of FIG. 1, wherein the input 102 is provided for the driver signal S1 ($\omega^+_{drive}$), the input 102' is provided for the driver signal S'1 ($\omega^-_{drive}$) phase-shifted by 180°, the input 104 is provided for the carrier signal S2 ($\omega^+_{CP}$), the input 104' is provided for the carrier signal S'2 ($\omega^-_{CS}$) phase-shifted by 180°, the input 106 is provided for the carrier signal S3 ($\omega^+_{CS}$) and the input 106' is provided for the carrier signal S'3 ($\omega^-_{CS}$) phase-shifted by 180°. The inputs 104, 104', 106, 106' for the primary and secondary carrier signals S2 ($\omega^+_{CP}$), S'2 ($\omega^-_{CS}$), S3 ($\omega^+_{CS}$), S'3 ($\omega^-_{CS}$) are fed by the signal generator 110, wherein the inputs 102, 102' of the sensor 100 are fed by an amplifier 111 using an amplification factor of +1 or −1, respectively. The output signal of the sensor 100 is amplified by the analogue amplifier 122. The amplified analogue sensor output signal is filtered by the analogue high-pass filter 124.

The output signal of the filter 124 is now fed to both analog/digital converters 126, 128 which sample the amplified filtered analogue sensor output signal using the so-called undersampling technology using a frequency which is on the one hand synchronous to the frequency of the carrier signal and on the other hand an integer divisor of the frequency of the carrier signal. The sampling frequency is thereby fed into the analog/digital converter 126, 128 by the signal generator 110.

The sensor output signal which is present in a digital form as a consequence of discretely sampled values after sampling by the analog/digital converter using the sample & hold member, is now fed into the digital signal processor 130 which processes the signal from the analog/digital converter 126 in a primary loop and the signal from the analog/digital converter 128 in a secondary loop. The digital signal processor comprises the digital band-pass filters 132, 134, the demodulators 136, 138, 140, 142, the digital low-pass filters 144, 146, 148, 150, a comparator 152, digital PI regulators 154, 156, 158, 160, a clock 162, a primary sine wave oscillator_164 and a secondary sine wave oscillator 166 as components which are software-implemented, which are arranged and interconnected as illustrated in FIG. 3. The sine wave oscillator 164 is connected to a digital/analogue converter 168 on the output side which is again connected to the amplifier 111. The secondary sine wave oscillator 166 is connected to a digital/analogue converter 170 and a digital/analogue converter 172 on its output side which are again connected to an input 106 and an input 106', respectively, of the sensor 100. The output of the digital PI regulator 158 is connected to an output interface 174 of the digital signal processor 130, at which the output signal, i.e. the rotational rate to be detected, is output in digital or also analogue form.

By the extended implementation of the digital signal evaluation arrangement with a primary and a secondary control circuit, compared to the conventional arrangement a clearly improved compensation of environmental influences, like for example a temperature drift, may be provided, so that an excellent frequency and amplitude stabilization of the sensor output signal may be achieved.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Method for processing an analogue output signal of a sensor, wherein the analogue sensor output signal comprises a carrier signal having a carrier frequency $\omega_c$ and being modulated by a measurand detected by the sensor, wherein the method comprises:

sampling of the analogue sensor output signal using a sampling frequency $\omega_A$ to obtain a sampled sensor output signal having an amplitude which is proportional to the measurand detected by the sensor, wherein the sampling frequency $\omega_A$ of the sampling signal is set to be an integer divisor n of the carrier frequency $\omega_c$, and wherein the phase of the sampling signal is set so that the sampling signal is synchronous to the carrier signal $\omega_c$.

2. Method according to claim 1, wherein the sampling signal is obtained by a synchronous frequency division of the carrier signal, wherein the carrier frequency $\omega_c$ of the carrier signal is an integer multiple n of the sampling frequency $\omega_A$, with: $\omega_c = n\, \omega_A$.

3. Method according to claim 1, wherein the carrier frequency $\omega_c$ of the carrier signal is set to a frequency which is higher or equal to 250 kHz.

4. Method according to claim 1, wherein the analogue output signal of a sensor is modulated by a driver signal having a driver frequency $\omega_{drive}$, wherein the carrier frequency $\omega_c$ of the carrier signal is higher than the frequency $\omega_{drive}$ of the driver signal by a factor of 30–500, wherein the sampled sensor output signal comprising the measurand represents a useful signal of the sensor.

5. Method according to claim 1, wherein the analogue sensor output signal is amplified analogously before the step of sampling.

6. Method according to claim 1, wherein the amplified analogue sensor output signal is high-pass filtered before the step of sampling to essentially remove low-frequency components of the signal.

7. Method according to claim 1, wherein the analogue sensor output signal is amplitude-modulated by the measurand.

8. Method according to claim 1, wherein the measurand is a rotational rate.

9. Method according to claim 1, wherein the sensor is a capacitive sensor.

10. Method according to claim 9, wherein the capacitive sensor is a capacitive rotational rate sensor.

11. Method according to claim 1, wherein the carrier signals are fed into the sensor at a center electrode of the same, wherein the sensor output signal is output to exterior electrodes of the sensor.

12. Method according to claim 1, wherein the carrier signals are fed into the sensor at exterior electrodes of the same, wherein the sensor output signal is output at a common electrode of the sensor.

13. Method according to claim 1, wherein the useful signal is input into a digital signal processor, wherein the digital signal processor outputs an analogue or a digital signal representing the measurand.

14. Processing device for providing a sampled sensor output signal, comprising:
- means for providing a carrier signal having a carrier frequency $\omega_c$;
- a sensor for detecting a measurand and for outputting an analogue sensor output signal, wherein the carrier signal is supplyable to the sensor, wherein the analogue sensor output signal comprises the carrier signal having the carrier frequency $\omega_c$, which is modulated by the measurand;
- means for providing a sampling signal having a sampling frequency $\omega_A$, wherein the sampling frequency $\omega_A$ of the sampling signal is set so that the sampling frequency $\omega_A$ is an integer divisor n of the carrier frequency $\omega_c$, and wherein the phase of the sampling signal is set so that the sampling signal is synchronous to the carrier signal;
- sampling means for sampling the analogue sensor output signal using the sampling signal to obtain the sampled sensor output signal having an amplitude which is proportional to the measurand detected by the sensor.

15. Device according to claim 14, wherein the sampling device is an analogue/digital converter having a sample & hold member.

16. Method for processing an analogue output signal of a sensor, wherein the analogue sensor output signal comprises a carrier signal having a carrier frequency $\omega_c$ and being modulated by a driver signal having a driver frequency $\omega_{drive}$ and by a measurand detected by the sensor, wherein the method comprises:
- sampling of the analogue sensor output signal using a sampling frequency $\omega_A$ to obtain a sampled sensor output signal being modulated by the driver signal and having an amplitude which is proportional to the measurand detected by the sensor, wherein the sampling frequency $\omega_A$ of the sampling signal is set to be an integer divisor n of the carrier frequency $\omega_c$, and wherein the phase of the sampling signal is set so that the sampling signal is synchronous to the carrier signal $\omega_c$.

17. Method for processing an analogue output signal of a sensor, wherein the analogue sensor output signal comprises a carrier signal having a carrier frequency $\omega_c$ and being modulated by a measurand, wherein the method comprises:
- sampling of the analogue sensor output signal using a sampling frequency $\omega_A$ to obtain a sampled sensor output signal, wherein the sampling frequency $\omega_A$ of the sampling signal is set to be an integer divisor n of the carrier frequency $\omega_c$, and wherein the phase of the sampling signal is set so that the sampling signal is synchronous to the carrier signal $\omega_c$;
- wherein the carrier signals are fed into the sensor at a center electrode of the same, wherein the sensor output signal is output to exterior electrodes of the sensor.

18. Method for processing an analogue output signal of a sensor, wherein the analogue sensor output signal comprises a carrier signal having a carrier frequency $\omega_c$ and being modulated by a measurand, wherein the method comprises:
- sampling of the analogue sensor output signal using a sampling frequency $\omega_A$ to obtain a sampled sensor output signal, wherein the sampling frequency $\omega_A$ of the sampling signal is set to be an integer divisor n of the carrier frequency $\omega_c$, and wherein the phase of the sampling signal is set so that the sampling signal is synchronous to the carrier signal $\omega_c$
- wherein the carrier signals are fed into the sensor at exterior electrodes of the same, wherein the sensor output signal is output at a common electrode of the sensor.

19. Processing device for providing a sampled sensor output signal, comprising:
- means for providing a carrier signal having a carrier frequency $\omega_c$;
- means for providing a driver signal having a driver frequency $\omega_{drive}$;
- a sensor for detecting a measurand and for outputting an analogue sensor output signal, wherein the carrier signal and the driver signal are supplyable to the sensor, wherein the analogue sensor output signal comprises the carrier signal having the carrier frequency $\omega_c$, which is modulated by the driver signal and by the measurand;
- means for providing a sampling signal having a sampling frequency $\omega_A$, wherein the sampling frequency $\omega_A$ of the sampling signal is set so that the sampling frequency $\omega_A$ is an integer divisor n of the carrier frequency $\omega_c$, and wherein the phase of the sampling signal is set so that the sampling signal is synchronous to the carrier signal;
- sampling means for sampling the analogue sensor output signal using the sampling signal to obtain the sampled sensor output signal being modulated by the driver signal and having an amplitude which is proportional to the measurand detected by the sensor.

20. Processing device for providing a sampled sensor output signal, comprising:
- means for providing a carrier signal having a carrier frequency $\omega_c$;
- a sensor for detecting a measurand and for outputting an analogue sensor output signal, wherein the carrier signal is supplyable to the sensor, wherein the analogue sensor output signal comprises the carrier signal having the carrier frequency $\omega_c$, which is modulated by the measurand;
- means for providing a sampling signal having a sampling frequency $\omega_A$, wherein the sampling frequency $\omega_A$ of the sampling signal is set so that the sampling frequency $\omega_A$ is an integer divisor n of the carrier frequency $\omega_c$, and wherein the phase of the sampling signal is set so that the sampling signal is synchronous to the carrier signal;
- sampling means for sampling the analogue sensor output signal using the sampling signal to obtain the sampled sensor output signal having an amplitude which is proportional to the measurand detected by the sensor;
- wherein the carrier signals are fed into the sensor at a center electrode of the same, wherein the sensor output signal is output to exterior electrodes of the sensor.

21. Processing device for providing a sampled sensor output signal, comprising:

means for providing a carrier signal having a carrier frequency $\omega_c$;

a sensor for detecting a measurand and for outputting an analogue sensor output signal, wherein the carrier signal is supplyable to the sensor, wherein the analogue sensor output signal comprises the carrier signal having the carrier frequency $\omega_c$, which is modulated by the measurand;

means for providing a sampling signal having a sampling frequency $\omega_A$, wherein the sampling frequency $\omega_A$ of the sampling signal is set so that the sampling frequency $\omega_A$ is an integer divisor n of the carrier frequency $\omega_c$, and wherein the phase of the sampling signal is set so that the sampling signal is synchronous to the carrier signal;

sampling means for sampling the analogue sensor output signal using the sampling signal to obtain the sampled sensor output signal having an amplitude which is proportional to the measurand detected by the sensor;

wherein the carrier signals are fed into the sensor at exterior electrodes of the same, wherein the sensor output signal is output at a common electrode of the sensor.

\* \* \* \* \*